(12) United States Patent
Ishibashi

(10) Patent No.: US 11,273,987 B2
(45) Date of Patent: Mar. 15, 2022

(54) CONVEYOR BELT

(71) Applicant: THE YOKOHAMA RUBBER CO., LTD., Tokyo (JP)

(72) Inventor: Yusuke Ishibashi, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 17/414,541

(22) PCT Filed: Sep. 25, 2019

(86) PCT No.: PCT/JP2019/037544
§ 371 (c)(1),
(2) Date: Jun. 16, 2021

(87) PCT Pub. No.: WO2020/137048
PCT Pub. Date: Jul. 2, 2020

(65) Prior Publication Data
US 2022/0041378 A1 Feb. 10, 2022

(30) Foreign Application Priority Data
Dec. 27, 2018 (JP) .............................. JP2018-245635

(51) Int. Cl.
*B65G 15/42* (2006.01)
*B29D 29/06* (2006.01)
*B65G 15/34* (2006.01)

(52) U.S. Cl.
CPC ............. *B65G 15/42* (2013.01); *B29D 29/06* (2013.01); *B65G 15/34* (2013.01); *B65G 2812/02178* (2013.01)

(58) Field of Classification Search
CPC ..................................................... B29D 29/06
See application file for complete search history.

(56) References Cited

U.S. PATENT DOCUMENTS

| | | | | |
|---|---|---|---|---|
| 2,237,173 A | * | 4/1941 | Brill | B65G 15/34 |
| | | | | 428/126 |
| 5,119,938 A | * | 6/1992 | Beckh | A24C 5/1857 |
| | | | | 198/847 |

(Continued)

FOREIGN PATENT DOCUMENTS

| | | | | |
|---|---|---|---|---|
| EP | 2829495 | * | 1/2015 | ............. B65G 15/34 |
| JP | 2004-017964 A | | 1/2004 | |

(Continued)

OTHER PUBLICATIONS

Office Action issued in the corresponding German Patent Application 11 2019 006 479.7, dated Oct. 7, 2021, with the English translation thereof.

*Primary Examiner* — James R Bidwell
(74) *Attorney, Agent, or Firm* — Carrier Blackman & Associates, P.C.; Joseph P. Carrier; William D. Blackman

(57) ABSTRACT

A conveyor belt is formed by covering a belt core body with a cover rubber. The cover rubber has a fine ridged/grooved structure formed on at least a portion of a surface thereof, and has a surface roughness of 1 μm or more and 12 μm or less, a degree of sharpness of 2 or more and 9 or less, and a specular gloss at an angle of incidence of 60° of 0.1 or more and 10 or less due to the fine ridged/grooved structure. The surface roughness is preferably 2 μm or more and 5 μm or less, and the degree of sharpness is preferably 3 or more and 5 or less, and the specular gloss at an angle of incidence of 60° is preferably 0.1 or more and 3 or less. Such conveyor belt is less likely to have a poor appearance due to bloom.

2 Claims, 3 Drawing Sheets

(56) References Cited

U.S. PATENT DOCUMENTS

| | | | |
|---|---|---|---|
| 7,419,050 B2 * | 9/2008 | Westerkamp | ......... D21F 3/0227 |
| | | | 162/358.4 |
| 2003/0230370 A1 | 12/2003 | Stubbendieck et al. | |
| 2016/0239734 A1 | 8/2016 | Metz et al. | |

FOREIGN PATENT DOCUMENTS

| | | | | |
|---|---|---|---|---|
| JP | 2008-174015 A | | 7/2008 | |
| JP | 2010-195586 A | | 9/2010 | |
| JP | 2017-045401 A | | 3/2017 | |
| WO | 2006/030167 A1 * | | 3/2006 | ............. B65G 17/08 |

* cited by examiner

| | | Comparative Example 1 | Comparative Example 2 | Comparative Example 3 | Example 1 | Example 2 | Example 3 | Example 4 |
|---|---|---|---|---|---|---|---|---|
| Surface properties | Surface roughness (μm) | 14 | 0.5 | 6 | 1 | 2 | 5 | 12 |
| | Sharpness | 10 | 1 | 1 | 2 | 3 | 5 | 9 |
| | Specular gloss | 0.05 | 11 | 8 | 0.1 | 0.1 | 3 | 10 |
| Evaluation item | Releaseability | Good | Severe adhesion | Some adhesion | No problem | Good | Good | No problem |
| | Appearance Immediately after vulcanization | Poor | Poor | Good | Good | Good | Good | Good |
| | Appearance After six months standing indoors | Very poor | Very poor | Poor | Good | Good | Good | Fair |

FIG. 3

CONVEYOR BELT

TECHNICAL FIELD

The present invention relates to a conveyor belt.

BACKGROUND ART

In the related art, belt conveyor devices for transporting objects to be conveyed such as coal, ore, grit, and the like are widely used in mines, quarries, civil engineering construction sites, and the like.

For example, Patent Document 1 below discloses the manufacture of a conveyor belt that, while realizing an excellent appearance, has excellent running stability regardless of the usage environment and has excellent durability against bending deformation, which involves unvulcanized rubber molding bodies having a fabric layered on surfaces thereof corresponding to the conveying and non-conveying surfaces of the conveyor belt and being pressed with a pair of upper and lower hot plates in order to transfer the texture pattern of the fabric to each surface, and peeling the fabric from the conveyor belt formed after vulcanization.

In Patent Document 1 below, the surface roughness of the conveyor belt is described as being from 1 μm to 15 μm, and more preferably from 1 μm to 7 μm.

CITATION LIST

Patent Literature

Patent Document 1: JP 2010-195586 A

SUMMARY OF INVENTION

Technical Problem

In rubber products such as conveyor belts, a phenomenon called bloom may occur on the surface during the storage period from the time the product is manufactured until it is used. Bloom is a phenomenon in which a wax or an anti-aging agent formulated to prevent degradation of the rubber migrates to the surface of the rubber, and although it does not affect the performance of the rubber, it causes deterioration of the appearance of the product. In other words, if the conveyor belt has a poor appearance, a product that is actually new and has no problems in terms of performance may be recognized as a product with degraded performance.

Although in the above-mentioned prior document, poor appearance due to unevenness and cracks on the belt surface is mentioned, bloom has not been considered and thus there is room for improvement.

In light of the foregoing, an object of the present invention is to provide a conveyor belt that is not prone to having a poor appearance caused by bloom.

Solution to Problem

To achieve the object described above, a conveyor belt according to the present invention includes a belt core body and a cover rubber covering the belt core body, the cover rubber having a fine ridged/grooved structure formed on at least a portion of a surface thereof, and having a surface roughness of 1 μm or more and 12 μm or less, a degree of sharpness of 2 or more and 9 or less, and a specular gloss at an angle of incidence of 60° of 0.1 or more and 10 or less due to the fine ridged/grooved structure.

Advantageous Effects of Invention

According to the present invention, the fine ridged/grooved structure formed on the surface of the conveyor belt causes light to diffusely reflect, making it difficult to recognize color differences on the surface of the conveyor belt. As a result, bloom generated on the conveyor belt surface over a storage period from immediately after vulcanization is less noticeable, which is advantageous for maintaining a good appearance of the conveyor belt. In addition, because a fine ridged/grooved structure is formed on the surface of the conveyor belt, scratches caused by the use of the conveyor belt are less noticeable, which is advantageous for maintaining a good appearance of the conveyor belt even after the start of use. In addition, since the fine ridged/grooved structure improves releaseability during conveyor belt vulcanization, it is advantageous for improving the productivity of the conveyor belt.

BRIEF DESCRIPTION OF DRAWINGS

FIG. 3 is a table illustrating evaluation results for conveyor belts having different surface characteristics.

DESCRIPTION OF EMBODIMENTS

A conveyor belt according to an embodiment of the present invention will be described in detail below with reference to the accompanying drawings.

Figures 1A, 1B:
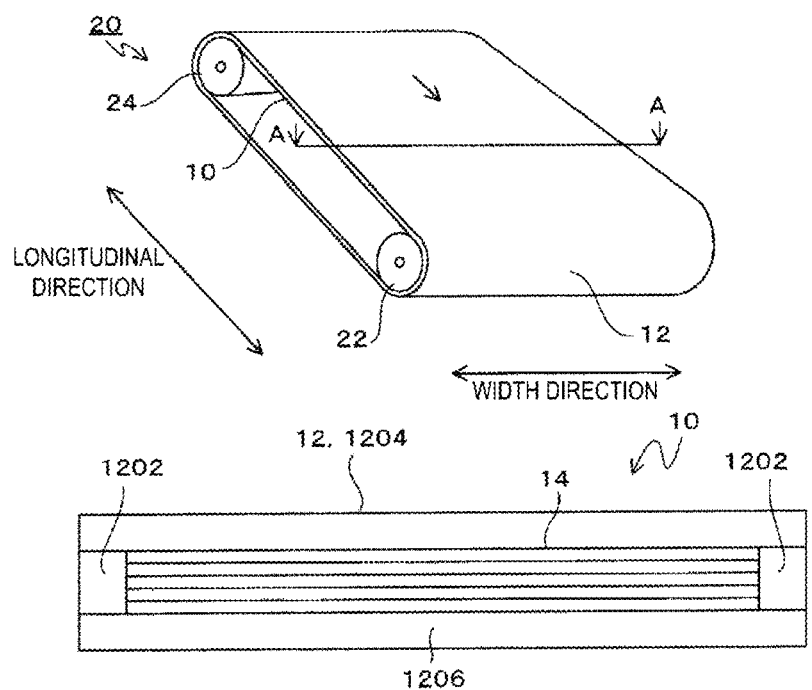
FIGS. 1A-1B are explanatory diagrams illustrating a configuration of a conveyor belt 10 according to an embodiment.

FIGS. 1A-1B are explanatory diagram illustrating a configuration of a conveyor belt 10 according to an embodiment. FIG. 1A is a perspective view illustrating a state where the conveyor belt 10 is being used, and FIG. 1B is a cross-sectional view of the conveyor belt 10 taken along A-A.

The conveyor belt 10 is used in a belt conveyor system 20 including a drive roller 22, a driven roller 24, and the conveyor belt 10 wound thereon.

The belt conveyor system 20 loads a conveyed object on the conveyor belt 10 and moves the conveyed object by moving the conveyor belt 10 in the arrow direction by using the drive roller 22 and the driven roller 24.

As illustrated in FIG. 1B, the conveyor belt 10 includes a belt core body 14 in which a plurality of canvases are layered, and a cover rubber 12 that covers the belt core body 14. Various known materials can be used as the canvases constituting the belt core body 14, including organic fibers such as nylon fibers, polyester fibers, and aramid fibers.

The cover rubber 12 includes edge rubber layers 1202, an upper surface cover rubber layer 1204, and a lower surface cover rubber layer 1206.

The edge rubber layers 1202 are respectively disposed on both sides of the belt core body 14 in the width direction.

The edge rubber layers 1202 are portions that protect both sides of the conveyor belt 10 including the belt core body 14 in the width direction.

The upper surface cover rubber layer 1204 and the lower surface cover rubber layer 1206 cover the belt core body 14 and the edge rubber layers 1202.

The upper surface cover rubber layer 1204 is a portion on which a conveyed object is loaded and conveyed, and the lower surface cover rubber layer 1206 is a portion that comes into contact with the rollers (drive roller 22, driven roller 24) that support the conveyor belt 10.

The cover rubber 12 (edge rubber layers 1202, upper surface cover rubber layer 1204, lower surface cover rubber layer 1206) and the belt core body 14 each extend with a constant width and form the conveyor belt 10.

Here, as a result of diligent research, the present inventors have discovered that, by forming a fine ridged/grooved structure on the surface of the cover rubber 12 and setting the surface characteristics to be within the ranges described below, bloom generated during the storage period becomes less noticeable.

In other words, the cover rubber 12 has a fine ridged/grooved structure formed on at least a portion of a surface thereof, and has a surface roughness of 1 μm or more and 12 μm or less, a degree of sharpness of 2 or more and 9 or less, and a specular gloss at an angle of incidence of 60° of 0.1 or more and 10 or less due to the fine ridged/grooved structure. More preferably, the cover rubber 12 preferably has a surface roughness of 2 μm or more and 5 μm or less, a degree of sharpness of 3 or more and 5 or less, and a specular gloss at an angle of incidence of 60° of 0.1 or more and 3 or less due to the fine ridged/grooved structure.

At least a portion of the surface of the cover rubber 12 means, for example, only the surface of the upper surface cover rubber layer 1204 (the surface on the opposite side to the belt core body 14), only the surface of the lower surface cover rubber layer 1206, only the surfaces of the edge rubber layers 1202, only the surfaces of the upper surface cover rubber layer 1204 and the edge rubber layers 1202, and the like; however, of course, it also includes a case where a fine ridged/grooved structure is formed on the entire surface of the cover rubber 12 (that is, the surfaces of the upper surface cover rubber layer 1204, the lower surface cover rubber layer 1206, and the edge rubber layers 1202).

The surface roughness Ra is the arithmetic mean roughness stipulated in JIS B 0601:2001, and is a parameter that can be evaluated by averaging states of the surface. In the present embodiment, the surface roughness of the cover rubber surface was measured using a laser microscope VK-X 150 available from Keyence.

The degree of sharpness (kurtosis) Rku is a numerical value indicating the degree of sharpness of a probability density function of a contour line stipulated in JIS B 0601:2001. In the present embodiment, the degree of sharpness of the cover rubber surface was measured using the laser microscope VK-X 150 available from Keyence.

Specular gloss Gs is obtained by measurement of specular reflection flux φs from a sample surface with respect to incident light for which an angle of incidence θ is defined, and the measurement method is stipulated in JIS Z 8741:1997. In the present embodiment, the specular gloss at an angle of incidence of 60° (Method 3: Gs))(60°)) was measured using Picogloss 500MC available from Erichsen.

Figure 2:
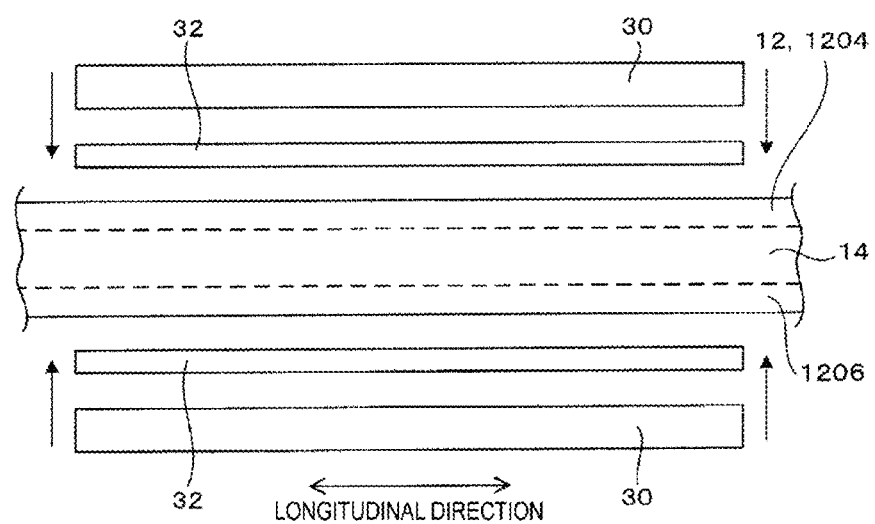
FIG. 2 is an explanatory diagram schematically illustrating a method of manufacturing the conveyor belt 10.

FIG. 2 is an explanatory diagram schematically illustrating a method of manufacturing the conveyor belt 10.

The conveyor belt 10 is subjected to a vulcanization treatment after the cover rubber 12, which is unvulcanized, and the belt core body 14 have been layered together. The vulcanization treatment of the conveyor belt 10 is performed by the application of heat and pressure by pressing thick plates 30, which are hot, against the upper and lower surfaces of the cover rubber 12 (the surfaces of the upper surface cover rubber layer 1204 and the lower surface cover rubber layer 1206).

At this time, metal plates 32 (for example, approximately 10 mm thick) having a fine ridged/grooved structure formed on a surface thereof are each sandwiched between a corresponding one of the thick plates 30 and the cover rubber 12, and the fine ridged/grooved structure is transferred to the surface of the cover rubber 12. The metal plates 32 have the fine ridged/grooved structure formed thereon by subjecting at least the surface on the side that is to come into contact with the cover rubber 12 to a blast treatment.

In other words, in the present embodiment, when the conveyor belt 10 is produced, during vulcanization of the cover rubber 12, the metal plates 32 having the fine ridged/grooved shape formed on a surface thereof by a blast treatment are brought into contact with at least a portion of the surface of the cover rubber 12, and the surface roughness, the sharpness, and the specular gloss of the surface of the cover rubber 12 are prepared by transferring the fine ridged/grooved shape thereto.

Note that in FIG. 2, the metal plates 32 and the thick plates 30 are pressed from the upper and lower directions of the cover rubber 12, but when the fine ridged/grooved shape is formed in the edge rubber layers 1202, the metal plates 32 and the thick plates 30 are pressed against the surfaces of the edge rubber layers 1202 from the sides of the cover rubber 12.

In addition, the method of preparing the surface characteristics of the cover rubber 12 is not limited to the above, for example, a fine ridged/grooved shape may be formed and transferred to surfaces of the thick plates 30, or a resin sheet having a fine ridged/grooved structure formed on a surface thereof may be used instead of the metal plates 32. In addition, instead of the metal plates 32, a fabric or a knitted fabric having a fine ridged/grooved structure on a surface thereof may be used.

On the other hand, the metal plates 32, have the features of high heat resistance of the material itself, good releaseability due to low surface energy, ease of processing by blast treatment, ease of replacement when the fine ridged/grooved structure deteriorates due to repeated use, and being reusable by performing the blast treatment again, and it is particularly preferable to transfer the fine ridged/grooved structure using the metal plates 32 as in the present embodiment.

Examples

Hereinafter, examples of the conveyor belt according to the present invention will be described.

FIG. 3 is a table showing evaluation results of conveyor belts having different surface characteristics.

In the present example, for conveyor belts having different surface roughnesses, degrees of sharpness, and specular glosses at an angle of incidence of 60°, releaseability from the metal plates 32 at the end of vulcanization (hereinafter referred to simply as "releaseability"), the visually observed state (appearance) of the surface immediately after vulcanization, and the visually observed state of the surface after being left to stand indoors for six months after vulcanization were evaluated.

Note that the meanings of the terms indicating the evaluation results of the visually observed state are as follows.

Good: Uniform glossiness throughout and no partial cloudiness is observed.

Fair: Partial white cloudiness can be observed in a few locations but no issues with appearance.

Poor: Partial white cloudiness observed in many locations and there are issues with appearance.

Very Poor: White cloudiness throughout, and there are issues with appearance.

As the evaluation criteria, Good and Fair were considered to be a pass, and Poor and Very Poor were considered to be a fail.

Note that the above-mentioned "white cloudiness" is a case where bloom is visible.

In the table illustrated in FIG. 3, parameters that do not conform to the numerical ranges of the surface characteristics of the conveyor belt according to the present invention, that is, a surface roughness of 1 or more and 12 or less, a degree of sharpness of 2 or more and 9 or less, and a specular gloss at an angle of incidence of 60° of 0.1 or more and 10 or less, are shaded.

In addition, as for the evaluation items, those that are considered to be a fail are indicated by shading.

Comparative Example 1 is a conveyor belt having a surface roughness of 14 µm, a sharpness of 10, and a specular gloss of 0.05. In Comparative Example 1, although releaseability was good, the visually observed state immediately after vulcanization was Poor, and the visually observed state after the conveyor belt was left to stand for six months was Very Poor.

Comparative Example 2 is a conveyor belt formed with a surface roughness of 0.5 µm, a sharpness of 1, and a specular gloss of 11. In Comparative Example 2, adhesion at the time of release was severe, the visually observed state immediately after vulcanization was Poor, and the visually observed state after the conveyor belt was left to stand for six months was Very Poor.

Comparative Example 3 is a conveyor belt having a surface roughness of 6 µm, a sharpness of 1, and a specular gloss of 8. In Comparative Example 3, there was some adhesion at the time of release. In addition, the visually observed state immediately after vulcanization was Good, but the visually observed state after the conveyor belt was left to stand for six months was Poor.

Next, as examples, conveyor belts conforming to the numerical ranges described above are considered.

Example 1 is a conveyor belt having a surface roughness of 1 µm, a sharpness of 2, and a specular gloss of 0.1. In Example 1, there were no problems with releaseability, the visually observed state immediately after vulcanization was Good, and the visually observed state after the conveyor belt was left to stand for six months was also Good.

Example 2 is a conveyor belt having a surface roughness of 2 µm, a sharpness of 3, and a specular gloss of 0.1. In Example 2, the releaseability was good, the visually observed state immediately after vulcanization was Good, and the visually observed state after the conveyor belt was left to stand for six months was also Good.

Example 3 is a conveyor belt having a surface roughness of 5 µm, a sharpness of 5, and a specular gloss of 3. In Example 3, the releaseability was good, and the visually observed state immediately after vulcanization was Good, and the visually observed state after the conveyor belt was left to stand for six months was also Good.

Example 4 is a conveyor belt having a surface roughness of 12 µm, a sharpness of 9, and a specular gloss of 10. In Example 4, there were no problems with releaseability, the visually observed state immediately after vulcanization was Good, and the visually observed state after the conveyor belt was left to stand for six months was Fair.

Considering these comparative examples and examples, with regard to releaseability, as illustrated in Comparative Example 2, it is conceived that when the surface roughness and the degree of sharpness are small (height distribution is reduced), and the specular gloss is high, air does not easily enter between the metal plate and the conveyor belt surface at the time of release, adhesion increases, and releaseability decreases. When releaseability is low, it takes time to release the conveyor belt and productivity decreases, which is not preferable.

In addition, with regard to the visually observed state, when the surface roughness and the degree of sharpness are large and the specular gloss is low, white cloudiness is visible on the conveyor belt surface, which leads to a poor appearance. In particular, after six months after vulcanization, the area where cloudiness occurs increases due to the occurrence of bloom.

On the other hand, the conveyor belts conforming to the numerical ranges of the conveyor belt according to the present invention maintained a good appearance even six months after vulcanization.

In other words, a conveyor belt having a cover rubber with a surface roughness of 1 µm or more and 12 µm or less, a degree of sharpness of 2 or more and 9 or less, and a specular gloss at an angle of incidence of 60° of 0.1 or more and 10 or less did not have problems with releaseability, and the appearance was maintained above a level at which there were no problems in appearance after being left to stand for six months immediately after vulcanization.

In particular, a conveyor belt having a surface roughness of 2 µm or more and 5 µm or less, a degree of sharpness of 3 or more and 5 or less, and a specular gloss at an angle of incidence of 60° of 0.1 or more and 3 or less, had good releaseability, and maintained a good appearance after being left to stand for six months immediately after vulcanization.

As described above, according to the conveyor belt according to the present invention, by forming a fine ridged/grooved structure having surface characteristics within the above ranges on the surface of the conveyor belt (cover rubber), diffuse reflection of light occurs, and it becomes difficult to recognize color differences on the surface of the conveyor belt. As a result, bloom that occurs on the surface of the conveyor belt immediately after vulcanization and over the storage period becomes less noticeable, which is advantageous from the perspective of maintaining a good appearance of the conveyor belt.

In addition, due to the fine ridged/grooved structure, scratches caused by the use of the conveyor belt are less noticeable, which is advantageous from the perspective of maintaining a good appearance of the conveyor belt even after the start of use.

In addition, since the fine ridged/grooved structure improves releaseability during conveyor belt vulcanization, it is advantageous for improving the productivity of the conveyor belt.

REFERENCE SIGNS LIST

10 Conveyor belt
12 Cover rubber
1202 Edge rubber layer
1204 Upper surface cover rubber layer
1206 Lower surface cover rubber layer
14 Belt core body
20 Belt conveyor system

The invention claimed is:

1. A conveyor belt comprising:
a belt core body; and
a cover rubber covering the belt core body, the cover rubber having a fine ridged/grooved structure formed on at least a portion of a surface thereof, and having a surface roughness of 1 μm or more and 12 μm or less, a degree of sharpness of 2 or more and 9 or less, and a specular gloss at an angle of incidence of 60° of 0.1 or more and 10 or less due to the fine ridged/grooved structure.

2. The conveyor belt according to claim 1, wherein the cover rubber has a surface roughness of 2 μm or more and 5 μm or less, a degree of sharpness of 3 or more and 5 or less, and a specular gloss at an angle of incidence of 60° of 0.1 or more and 3 or less due to the fine ridged/grooved structure.

\* \* \* \* \*